United States Patent
Daum et al.

(10) Patent No.: US 7,234,062 B2
(45) Date of Patent: Jun. 19, 2007

(54) AUTHENTICATION OF REMOTE APPLIANCE MESSAGES USING AN EMBEDDED CRYPTOGRAPHIC DEVICE

(75) Inventors: Wolfgang Daum, Erie, PA (US); Scott Charles Evans, Burnt Hills, NY (US); John Erik Hershey, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 847 days.

(21) Appl. No.: 09/748,441

(22) Filed: Dec. 27, 2000

(65) Prior Publication Data

US 2003/0001721 A1    Jan. 2, 2003

Related U.S. Application Data

(60) Provisional application No. 60/219,086, filed on Jul. 18, 2000.

(51) Int. Cl.
 *H04L 9/00* (2006.01)
(52) U.S. Cl. ........................ 713/181; 380/277
(58) Field of Classification Search ........ 713/168–170, 713/181, 201; 380/262, 265; 700/236, 241; 705/400; 709/208
See application file for complete search history.

(56) References Cited

U.S. PATENT DOCUMENTS

| | | | |
|---|---|---|---|
| 4,520,451 A | 5/1985 | McLaughlin | 364/900 |
| 4,688,250 A * | 8/1987 | Corrington et al. | 713/170 |
| 4,766,548 A | 8/1988 | Cedrone et al. | 364/479 |
| 4,918,728 A * | 4/1990 | Matyas et al. | 380/280 |
| 5,091,713 A | 2/1992 | Horne et al. | 340/541 |
| 5,142,694 A | 8/1992 | Jackson et al. | 455/67.1 |
| 5,708,963 A | 1/1998 | Mobley et al. | 455/12.1 |
| 5,720,034 A * | 2/1998 | Case | 380/283 |
| 5,825,890 A * | 10/1998 | Elgamal et al. | 713/151 |
| 5,844,808 A | 12/1998 | Konsmo et al. | 364/479.14 |
| 5,892,900 A | 4/1999 | Ginter et al. | 395/186 |
| 5,910,987 A | 6/1999 | Ginter et al. | 380/24 |
| 5,924,081 A | 7/1999 | Ostendorf et al. | 705/30 |
| 5,949,876 A | 9/1999 | Ginter et al. | 380/4 |
| 5,958,869 A | 9/1999 | Miller et al. | 364/479.01 |

(Continued)

OTHER PUBLICATIONS

Menezes et al., Handbook of Applied Cryptography, 1997, CRC Press, pp. 397-405.*

(Continued)

*Primary Examiner*—Gilberto Barrón, Jr.
*Assistant Examiner*—Minh Dinh
(74) *Attorney, Agent, or Firm*—Armstrong Teasdale LLP (57) ABSTRACT

A method for authenticating appliance messages sent between an appliance and an appliance communication center over an appliance communications network includes maintaining a shared message counter at both the appliance communication center. A shared message counter at both the appliance communication center and the remotely located appliance. An authentication algorithm is applied to the appliance message and the shared message counter to generate an authentication word. The appliance message is then transmitted to the appliance or the communication center along with the authentication word. Upon receiving the appliance message, the appliance or the communication center will apply an authentication algorithm to the appliance message and the shared counter to generate an authentication word. The generated authentication word may be compared to the word received with the appliance message to determine authenticity of the message.

11 Claims, 7 Drawing Sheets

U.S. PATENT DOCUMENTS

| | | |
|---|---|---|
| 5,959,869 A | 9/1999 | Miller et al. |
| 6,038,551 A | 3/2000 | Barlow et al. ............... 705/41 |
| 6,055,316 A * | 4/2000 | Perlman et al. ............ 380/262 |
| 6,061,668 A | 5/2000 | Sharrow .................... 705/400 |
| 6,073,134 A | 6/2000 | Shoup et al. ............... 707/100 |
| 6,366,682 B1 * | 4/2002 | Hoffman et al. ........... 382/115 |
| 7,103,185 B1 * | 9/2006 | Srivastava et al. ......... 380/277 |

OTHER PUBLICATIONS

Kaufman et al., Network Security Private Communication in a Public World, 1995, PTR Prentice Hall, pp. 237-243.*

"Commercial Laundry Services", Feb. 2000, Retrieved from the Internet on Aug. 17, 2005: <URL: http://www.cjnetworks.com/~jetz/comrcl.html>.*

* cited by examiner

| STX | RX ADD | TX ADD | NUM BYTES | CMD | MFG | APPL TYPE | DATA | CRC | ETX |
|---|---|---|---|---|---|---|---|---|---|
| 8 | 16 | 16 | 16 | 16 | 16 | 16 | Variable | 12 | 8 |

| STX | RX ADD | RX ADD | TX ADD | TX ADD | TX ADD | NUM BYTES | CMD | MFG | APPL TYPE | DATA | CRC | ETX |
|---|---|---|---|---|---|---|---|---|---|---|---|---|
| | 14FF | FC12 | 12FF | 3EFF | C254 | | | | | | | |

302: RX ADD, RX ADD
304: TX ADD, TX ADD, TX ADD

AUTHENTICATION OF REMOTE APPLIANCE MESSAGES USING AN EMBEDDED CRYPTOGRAPHIC DEVICE

CROSS-REFERENCE TO RELATED APPLICATIONS

This application claims the benefit of U.S. Provisional Application No. 60/219,086, filed Jul. 18, 2000 and titled Internet Enabled Appliance Command Structure.

BACKGROUND OF THE INVENTION

The present invention relates to home appliances such as refrigerators, dishwashers, and air conditioners. In particular, the present invention relates to authentication of messages transmitted and received between network enabled appliances and a central controller.

Appliances of the past were stand alone devices, operating on their own without cooperation between or communication among other devices. As a result (as one example) great expenditures of time and effort by repair personnel were required to diagnose problems in an appliance and to take corrective action. As another example, the current and proper operation of an appliance generally could not be determined without being physically present at the appliance. Thus, for example, whether or not the gas burner in a stove had been left on could not be determined without physical inspection.

However, remote testing and operation of appliances, even if it were available today, must be carefully controlled. In particular, authentication of messages between, for example, a service center (which may send appliance operation commands, for example) and the appliance (which may respond with status information, for example) becomes important. However, in the past, no authentication technique for appliance communications has been available. Furthermore, no suitable technique has been available for protecting the authentication technique against compromised authentication parameters, such as authentication keys.

A need has long existed in the industry for a mechanism that provides for authentication of remote appliance messages that addresses the problems noted above and others previously experienced.

SUMMARY OF THE INVENTION

The present invention provides for a method for authenticating appliance messages sent between an appliance and an appliance communication center over an appliance communications network. The method includes maintaining a shared message counter at both the appliance communication center and the remotely located appliance. An authentication algorithm is applied to the appliance message and the shared message counter to generate an authentication word. The appliance message is then transmitted to the appliance or the appliance communication center along with the authentication word.

Upon receiving the appliance message, the appliance or the appliance communication center will apply an authentication algorithm to the appliance message and the shared counter to generate an authentication word. The generated authentication word may be compared to the word received with the appliance message to determine authenticity of the message.

The present invention also provides for a method by which an existing authentication keying variable, K, is replaced with a new authentication keying variable, K'. K' is generated from K one byte at a time. A first authentication word, $W_1$, is generated using the existing authentication keying variable K, a counter, C, and a master keying variable, KM. Then, a portion of $W_1$ is selected as a first portion of K'. The remaining bytes in K' are generated by iteratively generating new authentication words, $W_n$, based on C, KM, and a concatenation of a prior authentication word and K. A portion of $W_n$ is then selected as an additional portion of K'.

DETAILED DESCRIPTION OF THE INVENTION

Figure 1:
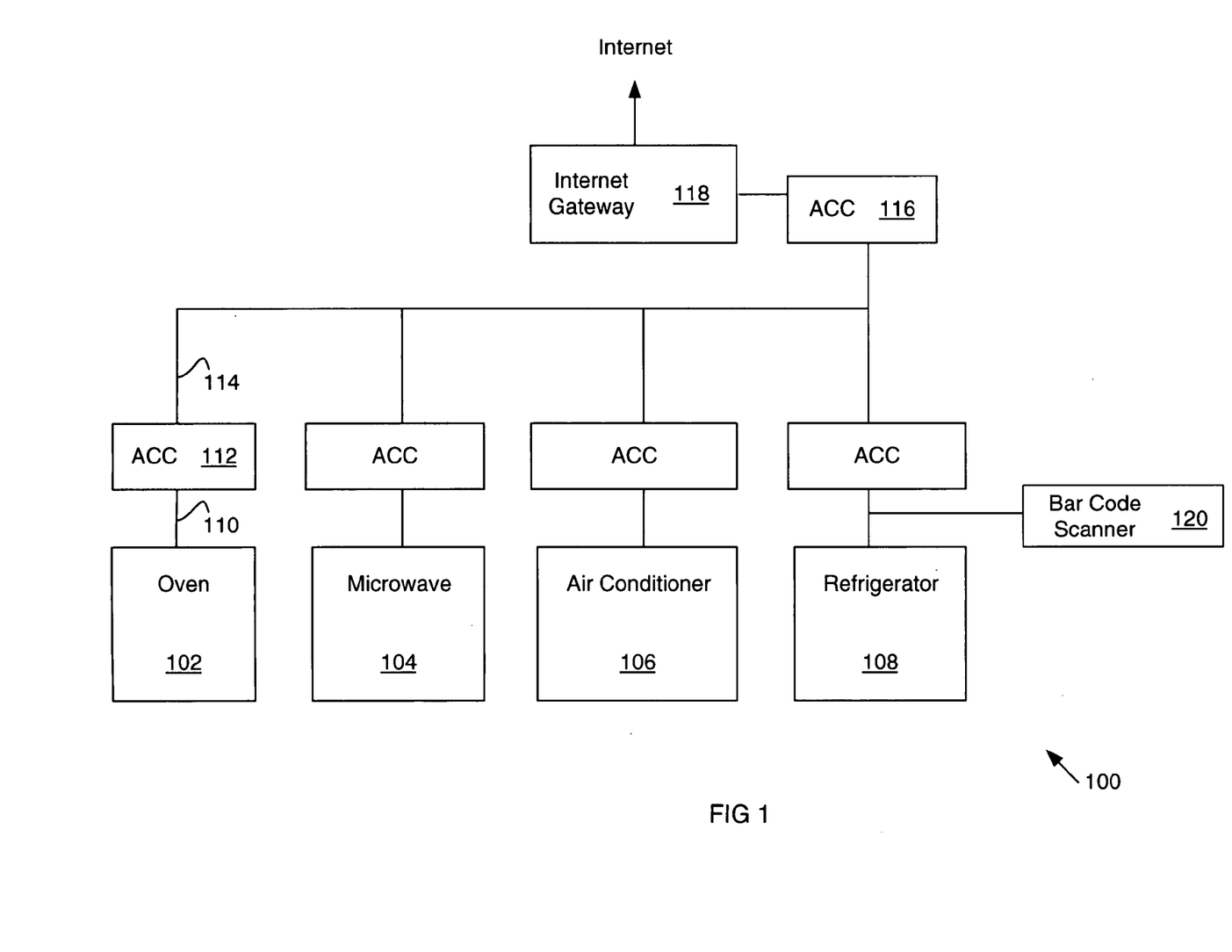
FIG. 1 illustrates an appliance communication network.

Turning to FIG. 1, that figure illustrates an appliance network 100 including a range or oven 102, a microwave 104, an air conditioner 106, and a refrigerator 108. As an example, the oven 102 connects through a serial bus 110 to an Appliance Communication Controller (ACC) 112. The ACC 112 connects to and communicates over the power line 114 to the ACC 116. The ACC 116, in turn, connects to an Internet gateway 118, such as that provided by a laptop or desktop computer (e.g., through a modem dial-up, T1 line, and the like). The appliance network 100 also includes a bar code scanner 120 that provides additional input flexibility. As will be described in more detail below, the appliance network 100 provides a command structure for secure bidirectional communication of appliance related data over a public access network. The command structure includes extendable addressing and commands, identifiers to ensure connection to the correct appliance, and support for context sensitive commands.

The command structure may be used over any multidrop network including Ethernet over 10 base T, power line carrier, RS422, and the like. The preferred embodiment uses a power line carrier. Power line carrier communication modules are manufactured, for example, by Domosys.

Figure 2:
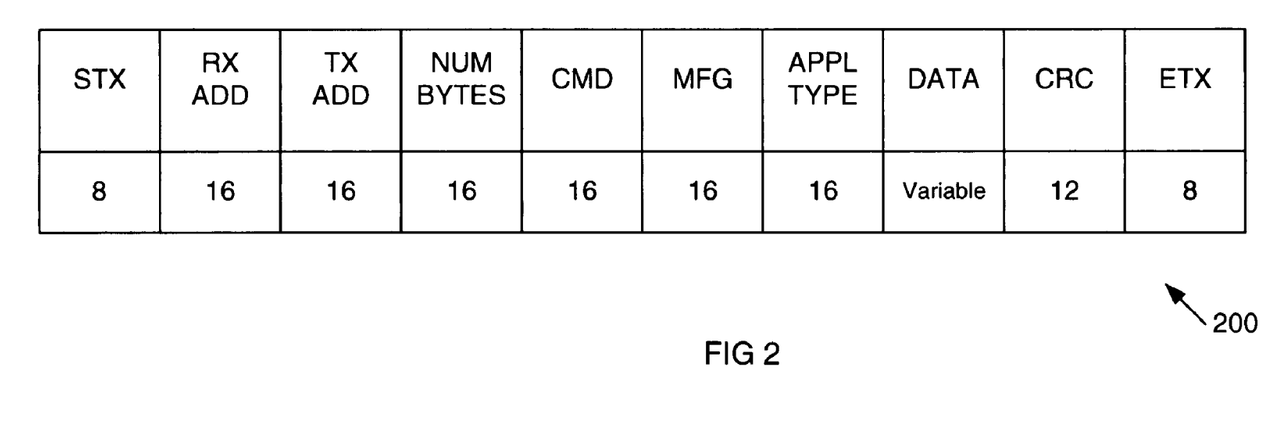
FIG. 2 shows a command frame for communicating over the appliance network.

Turning next to FIG. 2, that figure shows a command frame 200 divided into multiple fields. FIG. 2 shows each field name, and the number of bits for each field. The fields are as follows:

STX—8 bits—Start of Transmission (the preferred pattern is 0x02).

RX ADD—16 bits—Receiver address. RX ADD is a 16 bit extendable field. 256 values of the 65536 possible values are reserved for broadcast and extension addresses. The address 00FF is reserved for broadcast messages. Other addresses ending in FF translate the address field to the extended field as explained below.

TX ADD—16 bits—Transmitter address. TX ADD is a 16 bit extendable field. 256 values of the 65536 possible values are reserved for extension addresses. Extension addresses end in FF and translate the address field to the extended field.

NUM BYTES—16 bits—Number of Bytes. NUM BYTES gives the number of bytes that follows in the command frame, excluding the ETX bits. Thus, messages sizes may be as large as 65536+ETX+TX ADD+RX ADD+STX bytes.

CMD—16 bits—CMD defines the command to be issued to the appliance. This is a 16 bit extendable field. 256 values of the 65536 possible values are reserved for extension addresses. Extension addresses end in FF and translate the address field to the extended field. As explained in more detail below, this field may contain a context switch command as well as control commands.

MFG—16 bits—MFG defines the manufacturer of the appliance. This is a 16 bit extendable field. 256 values of the 65536 possible values are reserved for extension addresses. Extension addresses end in FF and translate the address field to the extended field.

APPL TYPE—16 bits—APPL TYPE is the appliance type field and defines the type of appliance which participates in context switching. APPL TYPE is a 16 bit extendable field. 256 values of the 65536 possible values are reserved for extension addresses. Extension addresses end in FF and translate the address field to the extended field.

DATA—variable number of bytes—The DATA field is typically used in conjunction with the CMD field. As examples, the DATA field may include encryption, display data, software updates, diagnostic commands, remote control access, and the like.

CRC—12 bits—The CRC field provides a 12 bit cyclic redundancy check computed over all bytes of the data packet except for the STX and ETX bytes, and the CRC field itself.

ETX—8 bits—ETX provides an End-of-Transmission character, preferably 0×03.

As noted above, several of the command frame fields are extendable. Field extension allows increasing a selected field in increments of 8 bits. Thus, for example, a 16 bit field may be extended to a 24 bit field. If it is determined that more than 24 bits are needed, then the 24 bit field may be extended to a 32 bit field, and so on.

Figure 3:
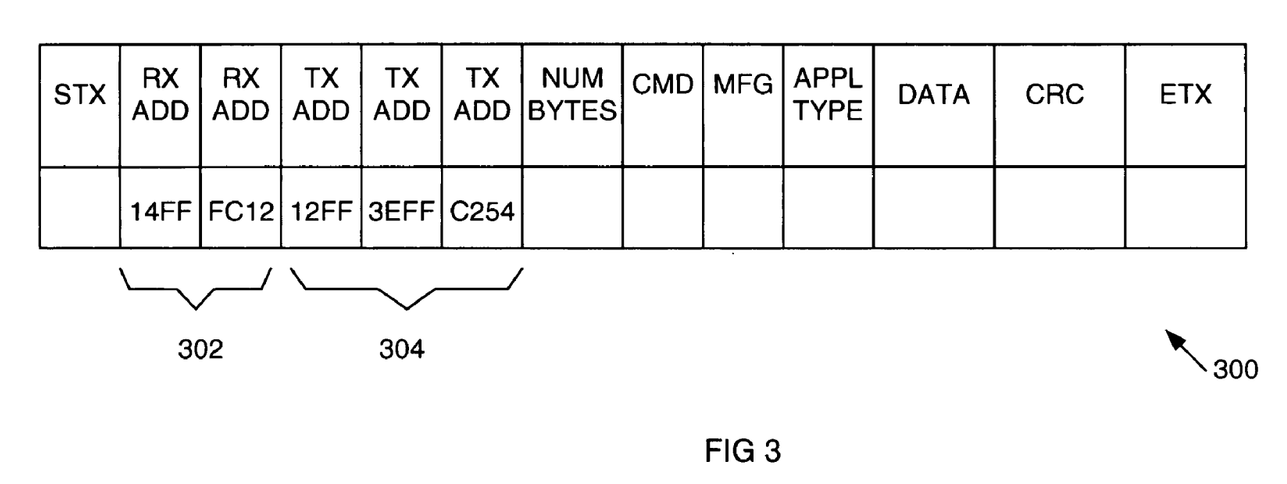
FIG. 3 depicts a command frame with extended fields.

FIG. 3 shows an example of a command frame 300 that extends the RX address field 302 to a 24 bit field. As shown, the RX address field holds the address 14FC12. The command frame also shows the TX address field 304 extended to 32 bits and holding the address 123EC254.

Note, however, that alternative command frames may be used, such as the CEBus™ command frame.

Each appliance may support one or more contexts. Contexts define a current mode of operation for the appliance, and thus may be used to accept or reject certain commands that are valid only in certain contexts. The contexts may include, as examples:

Service and Technology using local access, which includes commands directed by appliance field service technicians working within the home, and manufacturer engineering community developing products in their laboratories.

Service and Technology using remote access, which includes commands directed by appliance manufacturers product service organizations accessing remotely via the internet. Such access would be restricted from certain functionality, such as activating a burner on a cook-top.

Manufacturing, which includes commands directed by the appliance manufacturer on the factory floor for diagnostic testing, calibration, writing configuration parameters, etc. This community could also be used by the manufacturer to download new firmware to the appliances after they are already installed in the field.

Sales & Marketing, which includes commands directed by dealers on the showroom floor to demonstrate features to potential customers without necessarily activating all the loads. For instance, all the features of a microwave could be activated without actually turning on the magnetron.

Customer & Consumer Local Access, which includes commands directed by the product owner, or anyone granted access by the product owner, when that person(s) has access to the product in his immediate vicinity (i.e. access directly through the power line).

Customer & Consumer Remote Access, which includes commands directed by the product owner, or anyone granted access by the product owner, when that person (s) does not have access to the product in his immediate vicinity (i.e. has to go over the internet). Such access would be restricted from certain functionality, such as activating a burner on a cook-top.

Other Appliances and Extensions, which includes commands generated by other appliances or products. Such as a dishwasher signaling a hot water heater that it is about to demand x gallons of water, or a clothes dryer signaling a TV that it has finished its cycle so the appropriate message may be displayed.

Security, which includes commands directed to changing the user community context.

Context selection, and the resulting additional control or access provided in a certain context, is controlled through encryption in the command frame 200. For example, encrypted commands may be provided in the DATA field, as explained in the encryption section below.

In one implementation, context switching occurs as a result of a command that is not understood by the appliance or the ACC at the appliance or a command that is not allowed in the currently active context. When the appliance or the ACC receives a command that it does not understand or a command that is not allowed in the current context one of two responses preferably occur. In one embodiment the appliance or ACC will query the gateway or the server for a context switch. The gateway or server will determine if a context switch is allowed.

If the context switch request is valid then the server or gateway will determine if the context switch may be done locally (within the ACC) via a single command, within the LAN (from the gateway or server to the ACC) or across the internet. As an example, an Internet download may also be a fee based context switch. Such fee based context switches may be used for diagnostics, service, and other features for which a fee will be charged.

In general, each ACC will have a unique mutli-bit address, including an 8-BIT extendable building identifier prefix, while an appliance will have a unique serial number and a model number. The ACC is cognizant of the appliances to which it is connected by communicating with the appliances, for example, to discover their serial number and model number. To switch contexts, an authorization string may be transmitted in the command frame 200, e.g., API->Node Number "Request Community N" (INCL BLDG #). The appliance may then authenticate the message and reply "Authorized for community N" (INCL BLDG #) or "Authorization not recognized". When authorization is available, the node may, for example, remain authorized for a predetermined time (e.g., 5 minutes).

Additional commands are provided for explicit Deauthorization, bus arbitration (e.g., where one node becomes bus master, another node is a slave, and all other nodes "hold off" the bus). A command may also be provided to turn Free hold off (i.e., release all nodes from the hold off state so that they may try to gain control of the bus via arbitration, where hold off is the term used to describe the condition of nodes which are inhibited from talking while the secure context switching transaction is completed), and for Authorization standby (i.e., the temporary mode used to describe the condition where request for authorization to switch to a new context has been submitted, but waiting back for the response from the authorizing entity).

Figure 4:
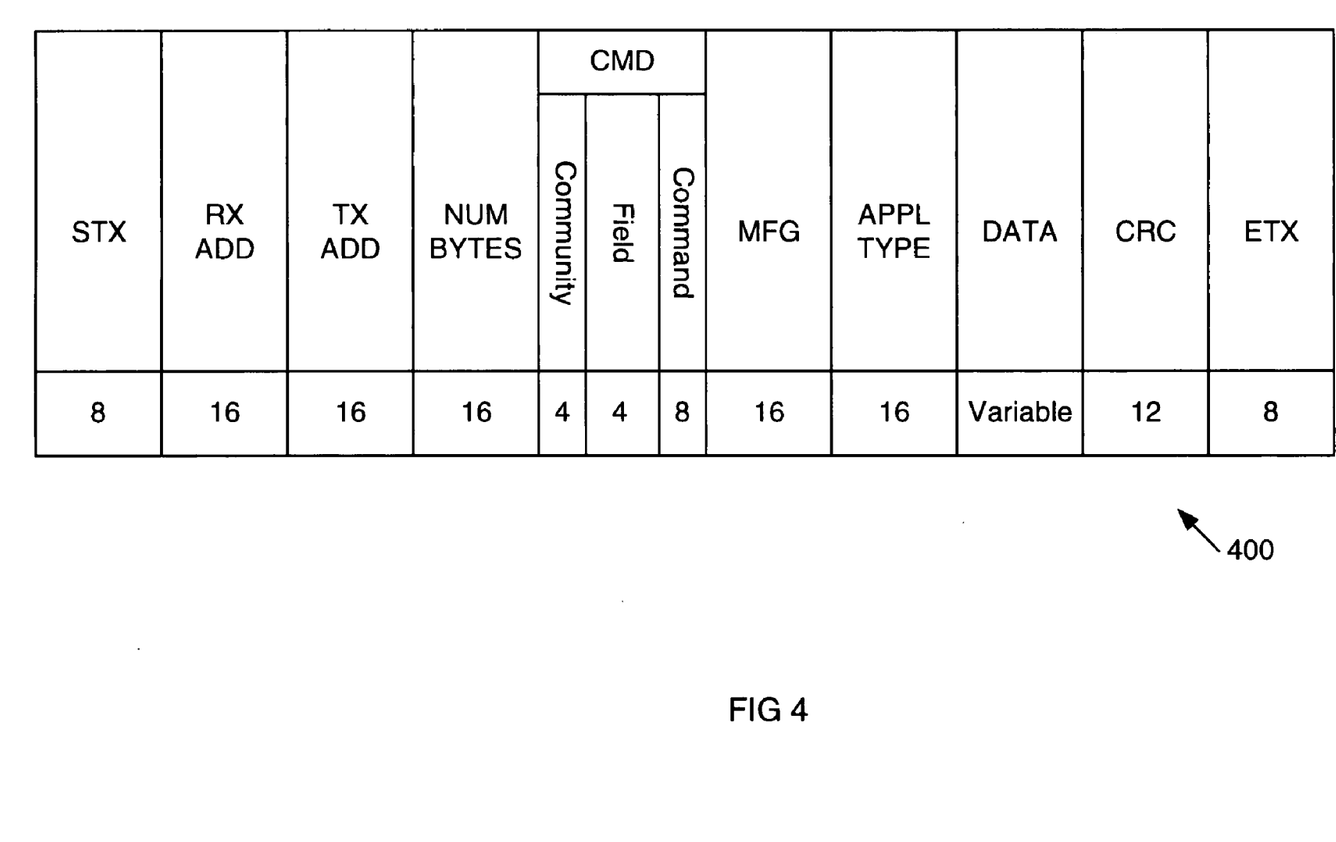
FIG. 4 illustrates a command frame with a subdivided CMD field for User Community, Field, and Command.

Appliances receive command frames over the appliance network 100 and respond appropriately. To this end, the CMD field may be split into subfields as shown in FIG. 4. Preferably, the CMD field includes a 4-bit User Community field, a 4-bit Field field, and an 8-bit Command field. The User Community specifies the highest level of the command structure, the Field field specifies a second level, and the Command field specifies the command within the User Community and Field to perform. Command structures may be stored in a memory in the appliance itself or the ACC connected to the appliance. Thus, for example, when an ACC receives a command from another device in the appliance network 100, the command will be translated into an action for the appliance to perform.

Figure 5:
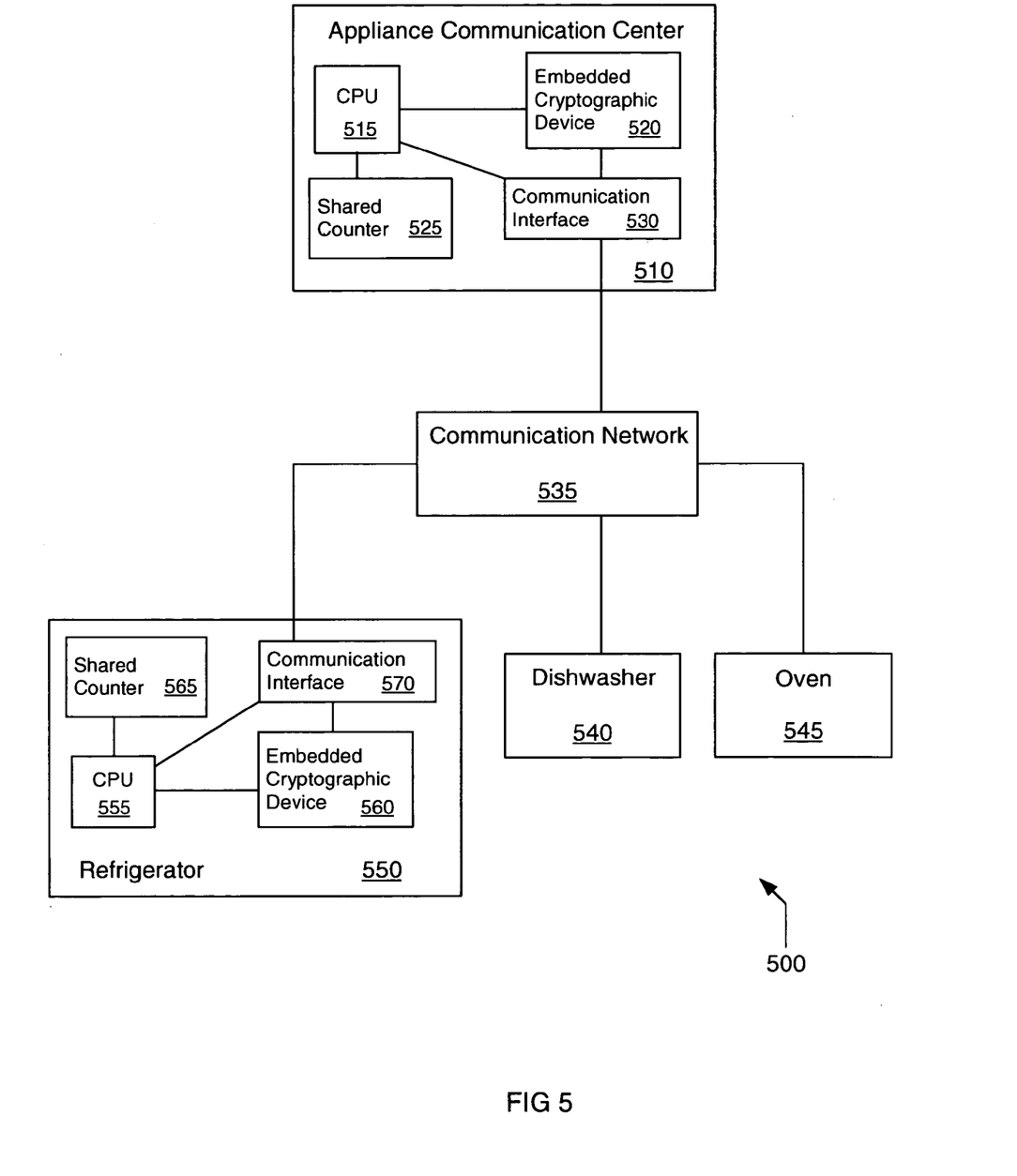
FIG. 5 illustrates a system for remote appliance monitoring, control, and diagnosis using an Embedded Cryptographic Device (ECD).

FIG. 5 illustrates an exemplary system 500 for remote appliance monitoring, control, and diagnosis using an Embedded Cryptographic Device (ECD) for message authentication. The system 500 includes an appliance communication center 510, a communication network 535, and home appliances such as a refrigerator 550, a dishwasher 540, and an oven 545, for example.

The appliance communication center 510 preferably includes a CPU 515, a shared counter 525, an Embedded Cryptographic Device (ECD) 520, and a communication interface 530. The shared counter 525 provides, as an example, register or other memory space in which the CPU 515 may maintain counters as explained below. The shared counter 525 need not be a separate memory. Rather, the shared counter 525 may be included in the ECD 520, for example. The ECD 520 preferably stores an algorithm used to authenticate data it receives from an appliance such as the refrigerator 550. To that end, the ECD 520 may include program and data memory from which the CPU 515 executes the cryptographic algorithm, or may include a dedicated CPU, program memory, and data memory with which to process the cryptographic algorithm and share results with the CPU 515. The CPU 520 is preferably linked to a communication interface 530 that connects the appliance communication center 510 to a communication network 535 using, for example, a network interface card, cable modem, dial up connection, or the like. The communication network 535 may be, for example, the Internet, and the communication interface 530 preferably communicates with the communication network 535 using the TCP/IP protocol.

As mentioned above, the system 500 also includes home appliances such as a refrigerator 550, a dishwasher 540, and an oven 545, as examples. The refrigerator 550 preferably includes a CPU 555, a shared counter 565, an ECD 560, and a communication interface 570. As noted above, the shared counter 565 may be part of the ECD 560, and the ECD 560 may provide program and data memory to the CPU 555, or may implement a CPU, program memory and data memory dedicated to cryptographic processing. The CPU 555 is linked to a communication interface 570 that connects the refrigerator 550 to the communication network 535, using, for example, an ACC or other powerline carrier communication device coupled to a gateway to the communication network 535. Other home appliances, such as the dishwasher 540 and the oven 545 are also connected to the communication network 535 and include the message authentication cryptographic hardware explained above.

In operation, the appliance communication center 510 preferably sends messages forming a reduced message set protocol (RMSP) over the communication network 535 to the home appliances 540, 545, 550. The reduced message set protocol (RMSP) is a relatively small library of messages that provide query, command, and information messages between the appliance communication center 510 and the home appliances. The home appliances such as the refrigerator 550 then authenticate the message, if required, received from the appliance communication center 510. If the message received by the refrigerator 550 from the appliance communication center 510 is authentic, the refrigerator 550 may then act on a command included in the message. Furthermore, the refrigerator 550 may transmit responsive messages back to the appliance communication center 510. The appliance communication center 510 may then authenticate the message from the refrigerator 550, if required, and take an appropriate action.

In general, query messages do not require authentication by the home appliances 540, 545, 550 that receive them. Examples of query messages include, "what is your counter setting?", "what is the next counter setting you expect the appliance communication center 510 to use?", "do you have a message to send?", "repeat the last message you sent", or "repeat the last message you accepted." Command messages, however, generally require authentication because they request the appliance to take a specific action. Examples of command messages include "perform the commanded action", for example "shut off", "turn on", "change your authentication keying variable", or "raise/lower your temperature." Another example of a command message is "continue". The Continue message indicates that the appliance communication center 510 has received an authenticated message from the appliance, and that the appliance should now increment its shared counter.

The home appliances 540, 545, and 550, may send query response messages or information messages. The query response messages preferably do not require authentication by the appliance communication center 510 that receives them. Examples of query response messages include "my counter setting is x", where x is the counter setting in the appliance, "the next counter setting I expect the appliance communication center 510 to use is y", "I have a message to send", "I do not have a message to send", or "the last message I sent was z". Information messages are preferably authenticated. Examples of information messages include "I am reporting the following information: Q." Q may be diagnostic information requested by the appliance communication center 510 or a reportable condition detected by sensors communicating locally to the home appliance such as the refrigerator 550, for example.

Figure 6:
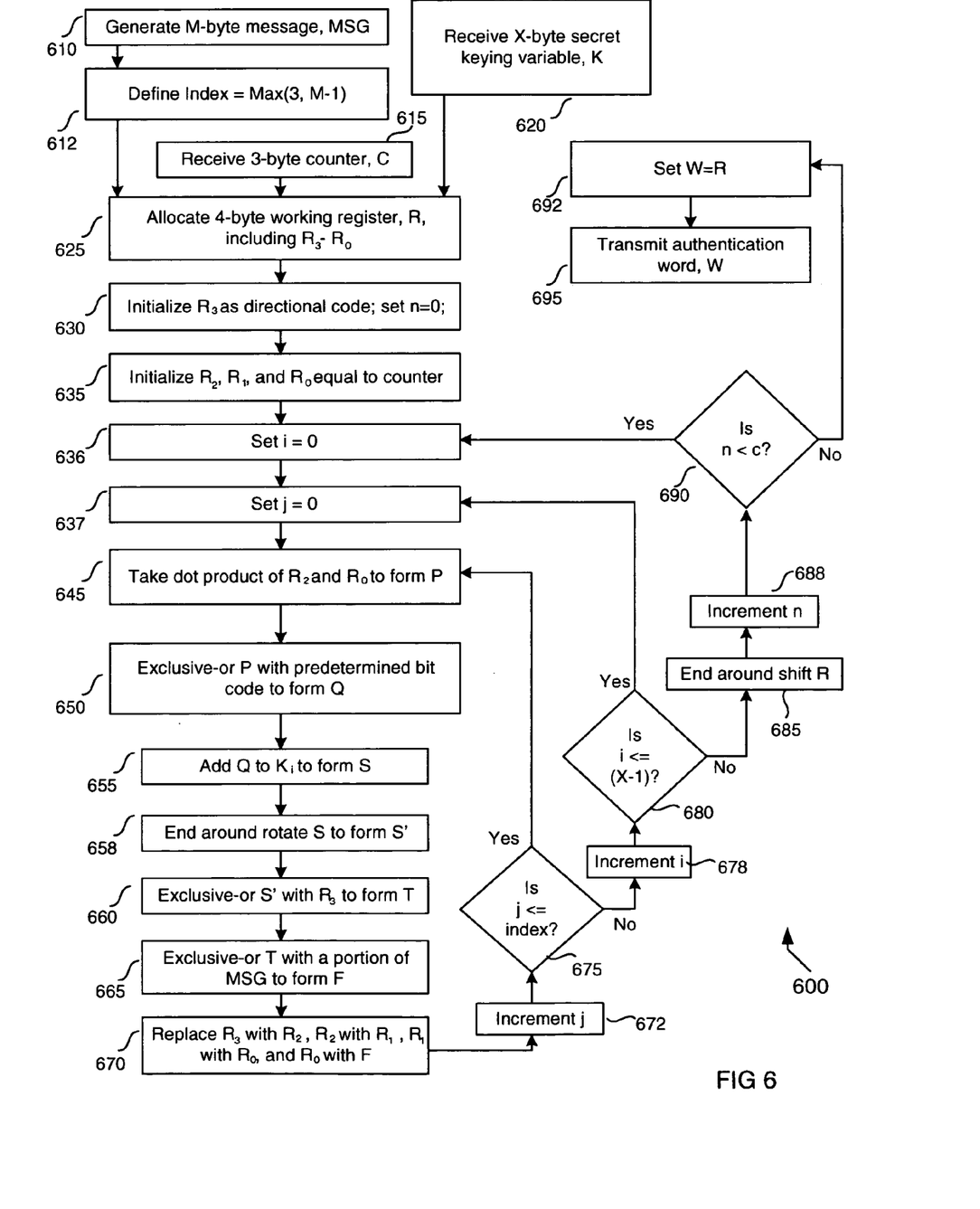
FIG. 6 illustrates a flow diagram of the cryptographic algorithm used to generate an authentication word.

FIG. 6 illustrates a flow diagram 600 of the authentication algorithm used to produce an authentication word, W. At step 610, the CPU 515 at an appliance communication center 510 generates an M-byte message, MSG, with bits MSG= $(m_{8(M-1)+7}, \ldots, m_{8(M-1)}, \ldots, m_{15}, \ldots, m_8, m_7, \ldots, m_0)$ that are grouped into M bytes ($MSG_{M-1}, \ldots, MSG_1$, $MSG_0$). Next, at step 612, an index value is determined as MAX(3, M-1). That is, the greater of the two values 3 or M-1 is the value of the index. At step 615, the CPU 515 reads or obtains a 3-byte (preferably) shared counter, C, with bits $C=(c_{23}, \ldots c_{16}, c_{15}, \ldots, c_8, c_7, \ldots, c_0)$ that are grouped into 3 bytes ($C_2, C_1, C_0$) from the shared counter 525. The shared counter 525 is preferably initially set to all zeros when the appliance is first connected to the network. Additionally, at step 620, the CPU reads or obtains an X-byte authentication keying variable, K, with bits $K=(k_{8X-1}, \ldots, k_{8X-8}, \ldots, k_{15}, \ldots, k_8, k_7, \ldots, k_0)$, that are grouped into X bytes ($K_{X-1}, K_{X-2}, \ldots, K_2, K_1, K_0$). In the preferred embodiment, X=6.

The authentication word, W, is a function of the M-byte message, the 3-byte shared counter, and the X-byte authentication keying variable. That is, $W=f(M,C,K)$. The complexity of the function, $f$, is generally appropriate for the class of CPUs that may be present in home appliances. At step 625, a 4-byte working register, R, is allocated with bits $R=(r_{31}, \ldots, r_{24}, r_{23}, \ldots, r_{16}, r_{15}, \ldots, r_8, r_7, \ldots, r_0)$ that are grouped into four bytes ($R_3, R_2, R_1, R_0$). Then, at step 630, $R_3$ is initialized as a directional code. That is, $R_3=(r_{31}, \ldots, r_{24})$ is set to $(0, \ldots, 0)$ when the transmission is to be sent from a remote terminal 550 to an appliance communication center 510, and to $(1, \ldots, 1)$ when the transmission is to be sent from an appliance communication center 510 to a remote terminal 550. Also, the counter n is set to zero. At step 635, $R_2, R_1$, and Ro are initialized to equal the current value of the 3-byte shared counter C. That is, $(R_2, R_1, R_0)=(r_{23}, \ldots r_{16}, r_{15}, \ldots, r_8, r_7, \ldots, r_0)=(c_{23}, \ldots c_{16}, c_{15}, \ldots, c_8, c_7, \ldots, c_0)$ Steps 636 and 637, respectively, initialize loop control variables i and j to 0.

Next at step 645, the Boolean dot product P of $R_2$ and $R_0$ (bit-by-bit Boolean AND) is formed as: $p_0=r_{16}r_0$, $p_7=r_{17}r_1$, $p_2=r_{18}r_2$, $p_3=r_{19}r_3$, $p_4=r_{20}r_4$, $p_5=r_{21}r_5$, $p_6=r_{22}r_6$, and $p_7=r_{23}r_7$ where $p=(p_7, p_6, p_5, p_4, p_3, p_2, p_1, p_0)$ Then at step 650, Q is formed by performing a bit-by-bit exclusive-or of P with (0,1,1,0,1,0,1), where $Q=(q_7, q_6, q_5, q_4, q_3, q_2, q_1, q_0)$. Next, at step 655, $S=(s_7, s_6, s_5, s_4, s_3, s_2, s_1, s_0)$ is formed by adding Q to the i-th key byte, $K_i$, i.e., ($k_{8i+7}, k_{8i+6}, k_{8i+5}, k_{8i+4}, k_{8i+3}, k_{8i+2}, k_{8i+1}, k_{8i}$), using binary addition and discarding the left-most carry bit. Then, at step 658, the byte S is end-around rotated to form the new byte $S'=(s_6, s_5, s_4, s_3, s_2, s_1, s_0, s_7)$. Then, at step 660, T is formed by performing a bit-by-bit exclusive-or of S' with the byte $R_3$. Next, at step 665, F is formed by performing a bit-by-bit exclusive-or of T with byte $MSG_{1\ modulo(index+1)}$. Next at step 670, the following replacements occur: byte $R_3$ with byte $R_2$, byte $R_2$ with byte $R_1$, byte $R_1$ with byte $R_0$, and byte $R_0$ with byte F.

Then, at step 672, j is incremented by unity. Then, at step 675, if j≦index, program flow passes back to step 645; otherwise, program flow proceeds to step 678. At step 678, i is incremented by unity. Then at step 680, if i≦(X−1), program flow passes back to step 637; otherwise, the program flow proceeds to step 685. At step 685, the CPU performs an end around shift of the R register by one bit, that is, it replaces $(r_{31}, r_{30}, \ldots, r_1, r_0)$ by $(r_{30}, r_{29}, \ldots, r_0, r_{31})$.

Next, at step 688, n is incremented by unity. Then, at step 690, if n<c, program flow passes to step 636; otherwise, the program flow passes to step 692. Note that the constant c is a system parameter, preferably 128 (although other values are also suitable depending on the particular system implementation), that controls how many times the processing steps 636-690 repeat. At step 692, the authentication word W is formed by setting W=R, that is, $w_{31}=r_{31}, w_{30}=r_{30}, \ldots, w_0=r_0$. Finally, at step 695, the authentication word W is transmitted with the message. Note that the message itself is not scrambled or encrypted. Rather, the authentication word W is provided to allow a receiver to determine whether the message is genuine.

Figure 7:
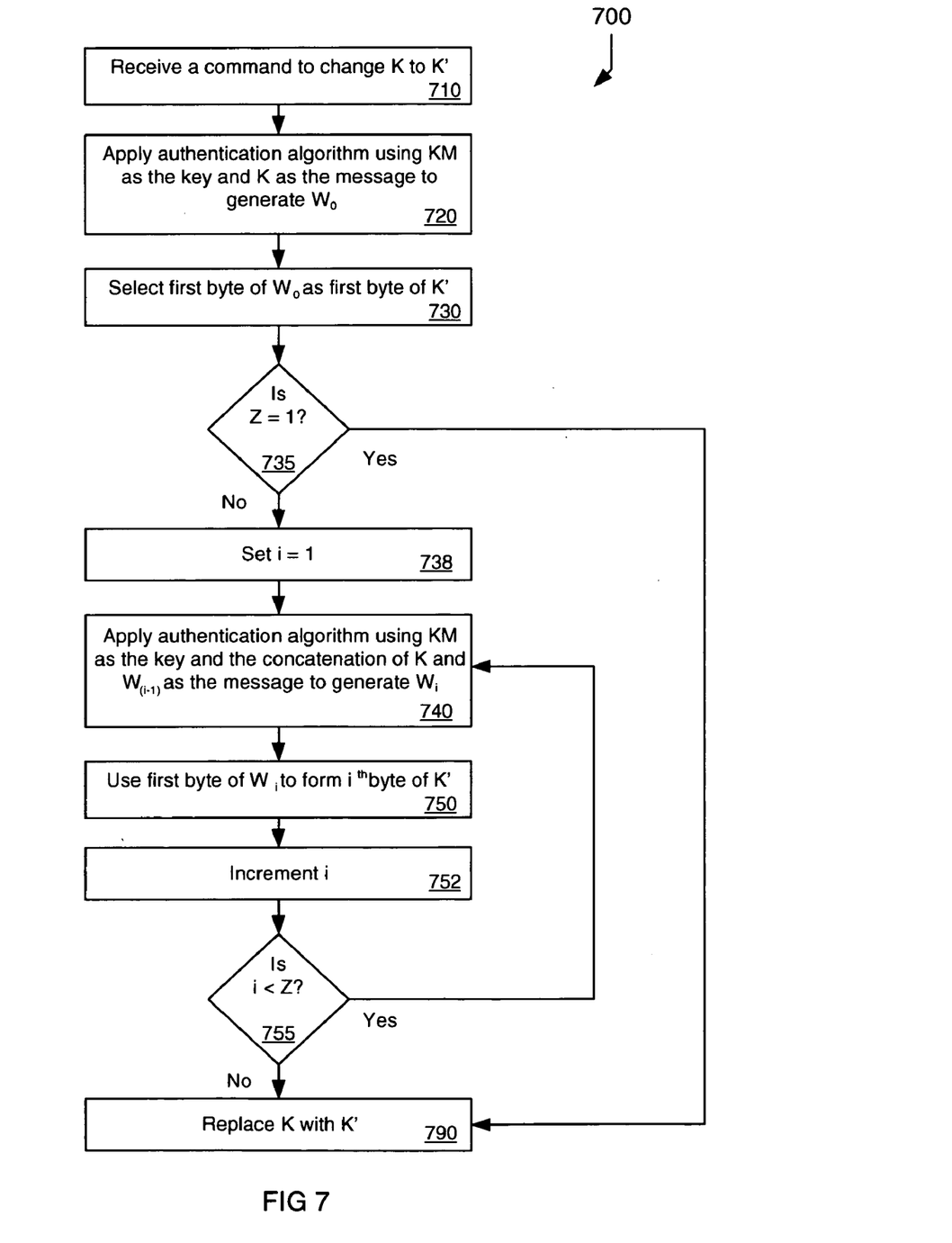
FIG. 7 shows a flow diagram of modifying an authentication keying variable K using a master keying variable, KM.

Because an authentication keying variable may sometimes be compromised by outside attack, the present authentication techniques provide a mechanism for generating one or more replacement authentication keying variables using a single additional master keying variable. FIG. 7 illustrates a flow diagram 700 of an algorithm that allows the authentication keying variable, K, to be changed in an appliance without having physical access to the appliance. To this end, a "master" keying variable, KM may be installed in the embedded cryptographic devices 520, 560. The new authentication keying variable K' is generated one byte at a time. While the new authentication keying variable K' may be the same size as the original authentication keying variable K, it need not be. The algorithm illustrated in FIG. 7 is generalized to allow for the generation of a new authentication keying variable K' having Z bytes. The command to change the authentication keying variable may also specify a change in the length of the authentication keying variable.

First, at step 710, the home appliance receives from the appliance communication center 510 a command message to change its keying variable K. Next, at step 720, the authentication algorithm as described in FIG. 6 is run using the master keying variable KM instead of the original K. The original authentication keying variable K is treated (processed) as the message. The result is a four-byte authentication word WO. Next, at step 730, a byte of the authentication word, WO, for example, bits $w_0, w_1, \ldots, w_7$ are selected as the first eight bits of the new authentication keying variable, K', the zero-th byte of K'.

At step 735, the method checks to see if Z (the number of bytes to be generated to complete the new authentication keying variable K') is equal to 1. If it is, the method proceeds to step 790. If not, the method continues to step 738. At step 738, a loop counter variable i is initialized to 1. Subsequently, at step 740, the authentication algorithm is applied using the master keying variable KM and processing the message comprised of the concatenation of K and $W_{(i-1)}$ to produce the authentication word $W_i$. Then, at step 750, the first byte of $W_i$ is selected as the $i^{th}$ byte of the new authentication keying variable, K'. At step 752, the loop counter variable i is incremented. Then, at step 755, the condition i<Z is evaluated. If the condition is true, the method will return to step 740. In this way, the method will continue to iteratively generate the subsequent bytes of K'. This will continue until the condition at step 755 evaluates to false, at which time the method will proceed to step 790. At step 790, the fully formed K' replaces K.

Figure 8:
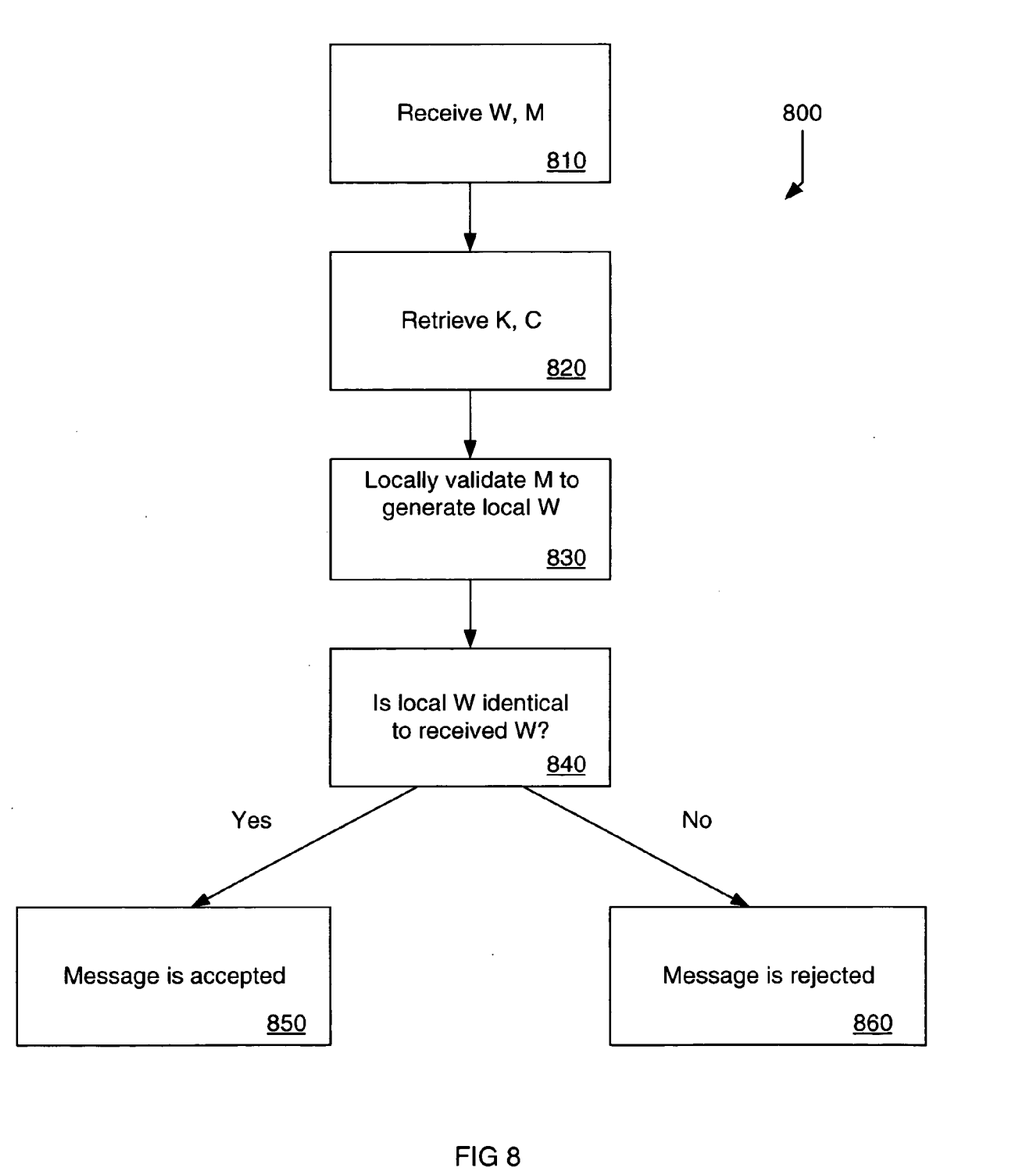
FIG. 8 illustrates a flow diagram of the authentication process.

FIG. 8 illustrates a flow chart of the authentication process 800. First, at step 810, a receiver (e.g., the refrigerator 550), receives an authentication word W, and a message M, from the appliance communication center 510. Next, at step 820, the refrigerator 550 retrieves its shared counter value, C, and its keying variable K. Then at step 830, the refrigerator 550 generates a local authentication word W to compare with the authentication word sent from the appliance communication center 510. Next, at step 840, the local authentication word is compared to the received authentication word. If the two authentication words match exactly, then at step 850, the message M, from the appliance communication center 510 is accepted by the refrigerator 550 and acted on. If the two authentication words do not match exactly, then at step 860, the message M is rejected.

Generally, the shared counters referenced above are preferably non-resettable, non-volatile, and incremented after each message sent or received. In general, an ECD increments its shared counter when it receives an answer from the appliance communication center 510 in response to a message sent to the appliance communication center 510. The appliance communication center 510 may store shared counters and keying variable for numerous home appliances distributed across numerous buildings, campuses, geographic regions, and the like. Thus, a single appliance communication center 510 may provide message authentication for a large number of home appliances by accessing the particular shared counter and keying variable for each appliance as messages are sent to and received from that appliance. The appliance communication center 510 may check the connection between the appliance communication center 510 and a receiver using a command that requires no action, except authentication and shared counter incrementation. A connection check may occur at predetermined elapsed times without communication from the receiver (e.g., 8 hours, 1 day, and the like).

After sending a message requiring authentication to an ECD, the appliance communication center 510 may query the ECD for the next counter setting that the ECD expected the appliance communication center 510 to use. If the shared counter had not been incremented, then the appliance communication center 510 may ask for a copy of the last message that the ECD had accepted.

It is also noted that the algorithm as presented above is not restricted to the particular implementation set forth above. Thus, the authentication keying variable length, shared counter length, number of iterations, and the like may be changed depending on the specific implementation desired and computational capacity available.

The present invention provides a mechanism by which messages sent between an appliance and an appliance communication center may be authenticated, thus providing security within the appliance network. Further, if a system compromise were to occur, a mechanism is provided to generate a new authentication keying variable within the appliance.

While the invention has been described with reference to a preferred embodiment, those skilled in the art will understand that various changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. In an appliance communication network, a method for authenticating appliance messages, the method comprising:
   maintaining at an appliance communication center a first shared message counter that counts messages communicated between the appliance communication center and a first appliance, the first shared message counter shared between the communication center and the first appliance;
   maintaining at the appliance communication center a second shared message counter that counts messages communicated between the appliance communication center and a second appliance, the second shared message counter provides a count separate from a count provided by the first shared message counter;
   generating a first authentication word by applying an appliance message, a shared authentication keying variable K shared between the appliance communication center and the first appliance, and the first shared message counter, as stored in the communication center, to an authentication algorithm;
   transmitting the appliance message and the first authentication word as an authenticated message to the first appliance;
   receiving the authenticated message at the first appliance;
   applying a third shared message counter, the shared authentication keying variable, as stored in the first appliance, and the appliance message to the authentication algorithm to generate the second authentication word;
   comparing the first authentication word and the second authentication word to determine authenticity of the authenticated message;
   installing a master keying variable within the first appliance and the appliance communication center; and
   changing, within the first appliance, the shared authentication keying variable by applying the shared authentication keying variable and the master keying variable to the authentication algorithm to generate a new shared authentication keying variable.

2. The method of claim 1, further comprising incrementing the third shared message counter, as stored in the first appliance, after receiving a genuine authenticated message at the first appliance.

3. The method of claim 1, wherein generating a first authentication word by applying comprises:
   establishing a working register R, comprising at least bytes R0, R1, R2, R3; initializing R3 to a directional code, representing a transmission from the appliance communication center to the first appliance;
   initializing at least R2, R1, and R0 to a plurality of bytes C2, C1, and C0 of the first shared message counter, as stored in the communication center, respectively;
   iteratively performing at least one arithmetic, logical and shifting operation on R; and
   setting the first authentication word equal to the value contained in R.

4. The method of claim 3, wherein iteratively performing at least one arithmetic, logical and shifting operation on R comprises iteratively performing, as many times as there are bytes in K, the steps of:
   establishing an index, equal to the greater of:
   a non-zero constant; and
   a number of bytes in the appliance message less one; and
   iteratively performing, a number of times equal to the index plus one:
   forming P as a dot product of R2 and R0;
   forming Q as a bitwise exclusive or of P with a constant expression '01010101';
   forming S by adding Q to K;
   forming S by end around rotating S;
   forming T as the bitwise exclusive or of S and R3;
   forming F as the bitwise exclusive or of T with a byte of the appliance message; and
   replacing R3 with R2, R2 with R1, R1 with R0, and R0 with F.

5. The method of claim 4, wherein the non-zero constant is at least 3.

6. The method of claim 1, further comprising incrementing the first shared message counter, as stored in the communication center, after transmitting the authenticated message to the first appliance.

7. A system comprising:
a plurality of appliances including a first appliance and a second appliance; and
an appliance communication center including:
   network connections terminating at the appliances;
   a processing circuit;
   a memory storing a master keying variable shared between the appliance communication center and the first appliance, an authentication keying variable shared between the appliance communication center and the first appliance, and a plurality of shared counters including a first shared message counter and a second shared message counter, the first shared message counter shared between the appliance communication center and the first appliance, the second shared message counter shared between the communication center and the second appliance, the first shared message counter configured to provide a count separate from a count provided by the second shared message counter, the first and second shared message counters configured to be non-resettable, the memory further storing instructions for:
   maintaining at the appliance communication center the first shared message counter;
   generating a first authentication word by applying an appliance message, a shared authentication keying variable, and the first shared message counter, as stored in the appliance communication center, to an authentication algorithm;
   transmitting the appliance message and the first authentication word as an authenticated message to the first appliance; and
   transmitting a command to the first appliance to change the shared authentication keying variable by applying the shared authentication keying variable and the master keying variable to the authentication algorithm.

8. The appliance communication center of claim 7, wherein the memory further stores instructions for incrementing the first shared message counter, as stored in the appliance communication center, after transmitting the authenticated message to the first appliance.

9. A system comprising:
an appliance communication center;
a first appliance including:
   a first shared message counter shared between the first appliance and the appliance communication center;
   a shared master keying variable shared between the first appliance and the appliance communication center;
   a shared authentication keying variable shared between the first appliance and the appliance communication center;
   a processor; and
   a memory coupled to the processor, the memory storing instructions for execution by the processor for:
   receiving an authenticated message, including a first authentication word and an appliance message, at the first appliance;
   generating a second authentication word by applying the first shared message counter, the shared authentication keying variable, and the appliance message to an authentication algorithm; and
   comparing the first authentication word and the second authentication word to determine authenticity of the authenticated message; and
a second appliance separate from the first appliance;
wherein the appliance communication center including a second shared message counter and a third shared message counter, the second shared message counter shared between the appliance communication center and the first appliance, the third shared message counter shared between the communication center and the second appliance, and the third shared message counter configured to provide a count separate from a count provided by the second shared message counter;
wherein the memory further stores instructions for generating a new shared authentication keying variable, upon the first appliance receiving a command from the appliance communication center, by applying the shared authentication keying variable and the shared master keying variable to the authentication algorithm.

10. The appliance message authentication device of claim 9, wherein the memory stores instructions for execution by the processor for incrementing the first shared message counter, as stored in the first appliance, after receiving a genuine authenticated message at the first appliance.

11. In an appliance communication network, a method for authenticating appliance messages, the method comprising:
   maintaining at a first appliance a first non-resettable shared message counter, the first non-resettable shared message counter shared between the first appliance and a remotely located appliance communication center;
   maintaining at the appliance communication center a second non-resettable shared message counter that counts messages communicated between the appliance communication center and the first appliance;
   maintaining at the appliance communication center a third non-resettable shared message counter that counts messages communicated between the appliance communication center and a second appliance, the third non-resettable shared message counter provides a count separate from a count provided by the second non-resettable shared message counter;
   generating a first authentication word by applying an appliance message, a shared authentication keying variable shared between the first appliance and the appliance communication center, and the first non-resettable shared message counter, as stored in the first appliance, to an authentication algorithm;
   transmitting the appliance message and the first authentication word as an authenticated message to the appliance communication center;
   receiving the authenticated message at the appliance communication center;
   applying the second non-resettable shared message counter, the shared authentication keying variable, as stored in the appliance communication center, and the appliance message to the authentication algorithm to generate a second authentication word;
   comparing the first authentication word and the second authentication word to determine authenticity of the authenticated message;
   installing a master keying variable within the first appliance and the appliance communication center; and
   changing, within the first appliance, the shared authentication keying variable by applying the shared authentication keying variable and the master keying variable to the authentication algorithm to generate a new shared authentication keying variable.

* * * * *